(12) United States Patent
Göranson et al.

(10) Patent No.: US 9,615,681 B2
(45) Date of Patent: Apr. 11, 2017

(54) ARRANGEMENT WITH A BASE PLATE AND A COVERING HOOD FOR A SCREEN

(76) Inventors: Dag Göranson, Falkenberg (SE); Örjan Göranson, Falkenberg (SE)

( * ) Notice: Subject to any disclaimer, the term of this patent is extended or adjusted under 35 U.S.C. 154(b) by 62 days.

(21) Appl. No.: 13/640,718

(22) PCT Filed: Apr. 4, 2011

(86) PCT No.: PCT/SE2011/000061
§ 371 (c)(1),
(2), (4) Date: Oct. 11, 2012

(87) PCT Pub. No.: WO2011/133083
PCT Pub. Date: Oct. 27, 2011

(65) Prior Publication Data
US 2013/0025801 A1    Jan. 31, 2013

(30) Foreign Application Priority Data

Apr. 23, 2010 (SE) .................................. 1000414

(51) Int. Cl.
*A47G 5/00* (2006.01)
*E04B 2/74* (2006.01)
*F16M 11/42* (2006.01)

(52) U.S. Cl.
CPC .............. *A47G 5/00* (2013.01); *E04B 2/7427* (2013.01); *F16M 11/42* (2013.01)

(58) Field of Classification Search
CPC ... A47G 5/00; G09F 15/0068; G09F 15/0062; G09F 15/0037; E04B 2/7427; E04B 2/7431; E04H 12/2238; E04H 12/2246; E04H 12/2261; F16M 11/42

USPC .................................................. 160/135, 351
See application file for complete search history.

(56) References Cited

U.S. PATENT DOCUMENTS

| 138,507 | A | * | 5/1873 | Lazarus | .................... E06B 9/01 |
| | | | | | 160/127 |
| 267,007 | A | * | 11/1882 | Lott | ............................. 160/220 |
| 1,416,733 | A | * | 5/1922 | Matson | ......................... 160/125 |
| 1,770,755 | A | * | 7/1930 | Kleinpell | ............................ 40/1 |
| 3,620,587 | A | * | 11/1971 | Ahmann | ....................... 312/203 |
| 3,630,309 | A | * | 12/1971 | Wenger et al. | ................. 181/30 |
| 4,516,620 | A | | 5/1985 | Mulhern | |

(Continued)

FOREIGN PATENT DOCUMENTS

| CA | 2 233 826 A1 | 9/1999 |
| DE | 29618316 U1 | 1/1997 |

(Continued)

*Primary Examiner* — Blair M Johnson
*Assistant Examiner* — Abe Massad
(74) *Attorney, Agent, or Firm* — McGinn IP Law Group, PLLC

(57) ABSTRACT

An arrangement for a screen with a number of sections which are foldable and/or pivotal in relation to one another and which form a screen-off, which includes a fixed section and two sections pivotal in relation thereto, or one fixed section and a number of foldable or pivotal sections in relation to one another, which are pivotally mounted on the fixed section, the fixed section being mounted on a foot, the foot includes a supporting base plate, and the base plate is covered with a hood for preventing direct contact of at least the upper side of the base plate and possibly also the major portion of the edges of the base plate.

31 Claims, 8 Drawing Sheets

(56) References Cited

U.S. PATENT DOCUMENTS

| | | | | |
|---|---|---|---|---|
| 5,272,848 A | * | 12/1993 | Maas | 52/238.1 |
| 5,403,979 A | * | 4/1995 | Rogers et al. | 181/30 |
| 5,421,548 A | * | 6/1995 | Bennett et al. | 248/129 |
| 5,530,211 A | * | 6/1996 | Rogers et al. | 181/30 |
| 5,584,546 A | * | 12/1996 | Gurin et al. | 312/200 |
| 5,599,006 A | * | 2/1997 | Gevaux et al. | 256/25 |
| 5,651,405 A | * | 7/1997 | Boeddeker et al. | 160/135 |
| 6,085,861 A | * | 7/2000 | Jines | 181/30 |
| 6,305,659 B1 | | 10/2001 | Metelski | |
| 6,615,551 B2 | * | 9/2003 | Chesser et al. | 52/36.4 |
| 6,772,816 B2 | * | 8/2004 | Carter et al. | 160/135 |
| 6,969,031 B2 | * | 11/2005 | Ugent et al. | 248/125.8 |
| 7,213,632 B1 | * | 5/2007 | Goldstein | A47G 5/00 160/135 |
| 7,614,600 B1 | * | 11/2009 | Smith et al. | 248/519 |
| 7,628,360 B2 | * | 12/2009 | Anthes et al. | 248/125.8 |
| 8,091,605 B1 | * | 1/2012 | Melhart | 160/135 |
| 8,365,798 B2 | * | 2/2013 | Feldpausch et al. | 160/84.06 |
| 8,677,911 B2 | * | 3/2014 | McRorie | 108/50.02 |
| 2005/0269046 A1 | * | 12/2005 | Freeman | 160/351 |

FOREIGN PATENT DOCUMENTS

| | | |
|---|---|---|
| DE | 202005010245 U1 | 11/2005 |
| WO | WO 2004/071251 A1 | 8/2004 |

\* cited by examiner

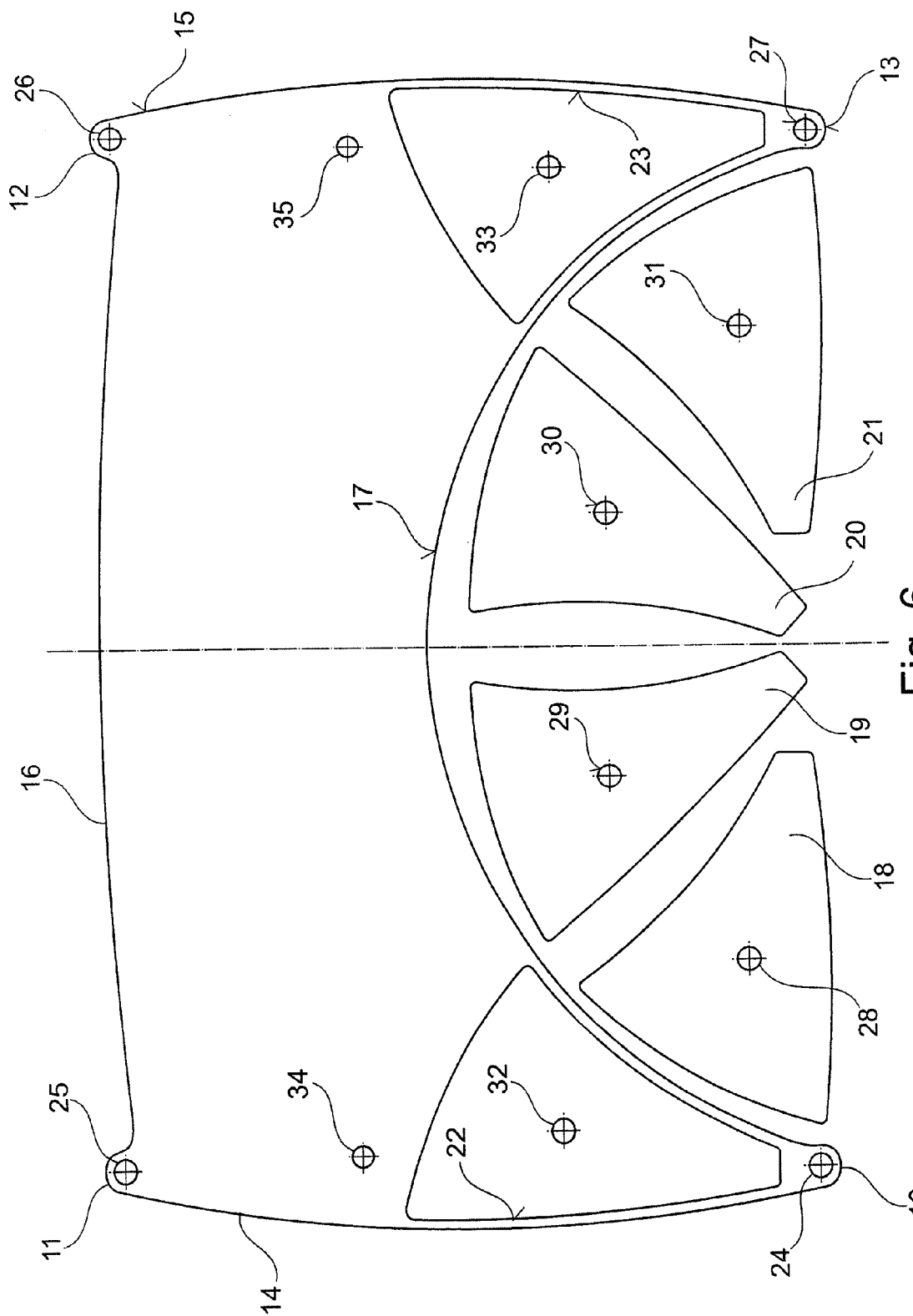

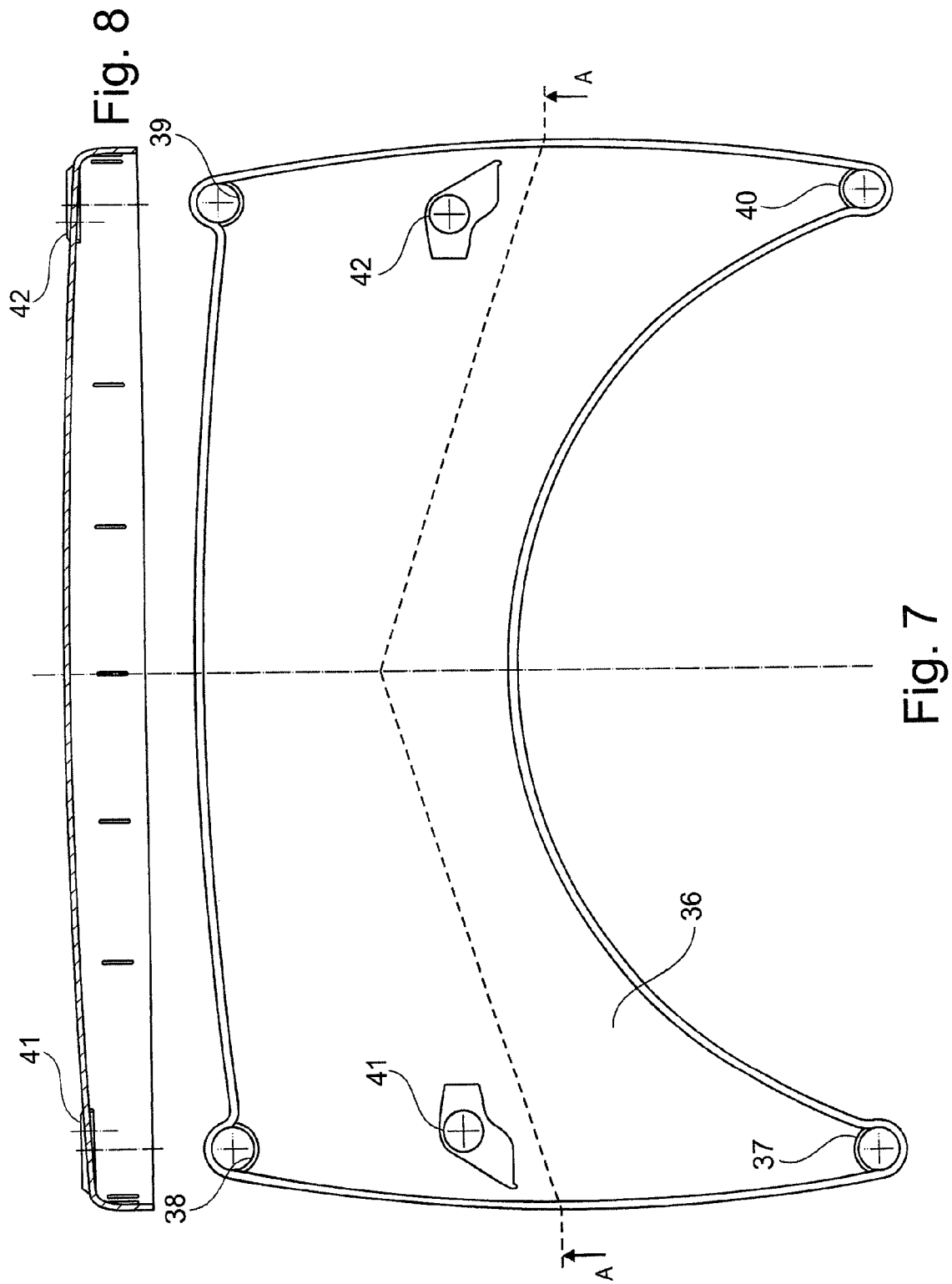

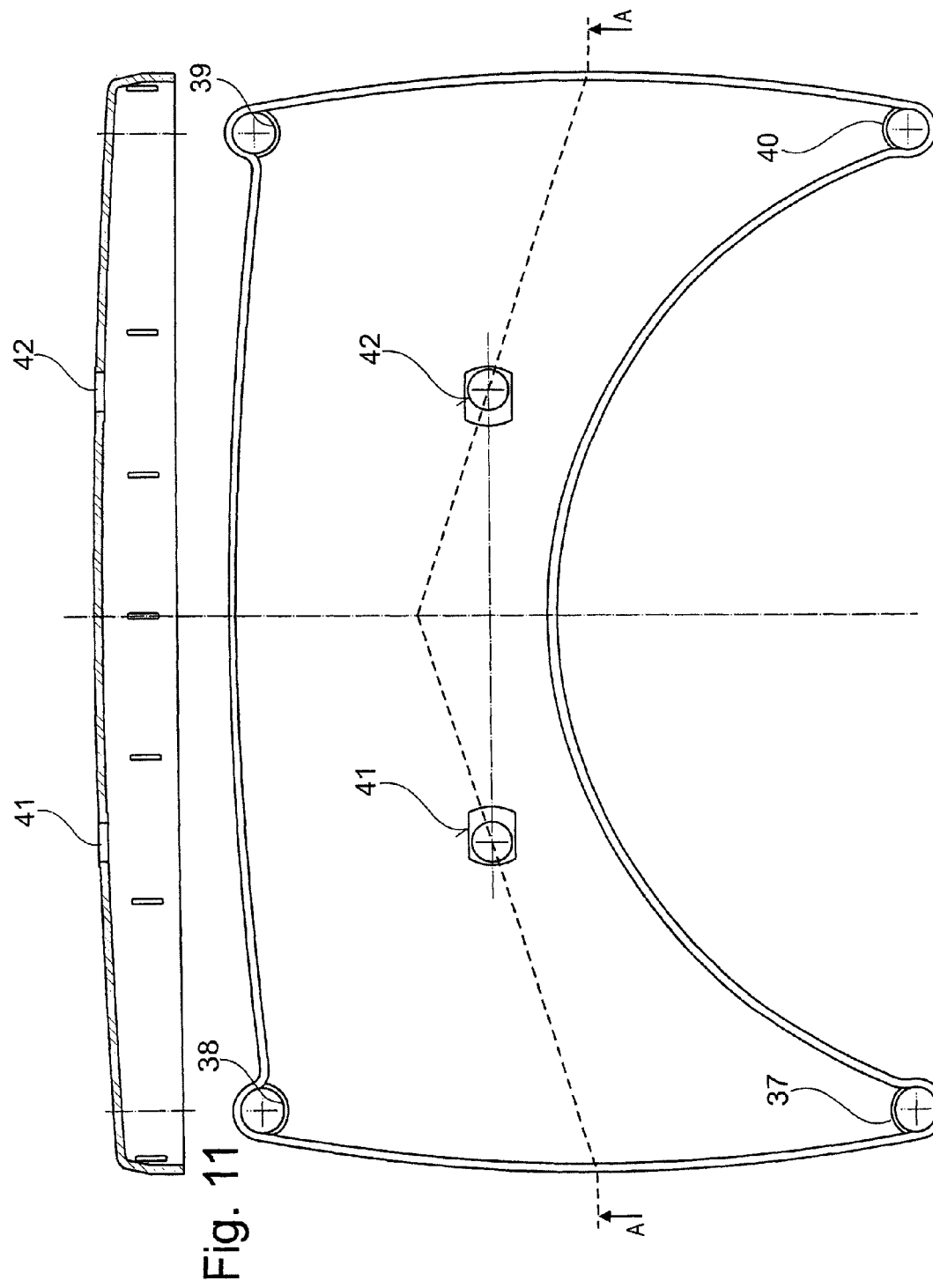

ARRANGEMENT WITH A BASE PLATE AND A COVERING HOOD FOR A SCREEN

BACKGROUND OF THE INVENTION

Field of the Invention

The present invention relates to an arrangement for a screen and, more particularly, an arrangement for a screen, which includes a foot.

Description of the Related Art

Primarily within medical care, as a rule there is very little free space surrounding the patient, regardless of whether this a matter of a conventional medical care ward, intensive care ward, post-operative recovery ward or emergency ward. Consequently, it is of the utmost importance to design those products which are needed in the immediate vicinity of the patient to be as compact and user-friendly as possible. Moreover, the ability to maintain a high standard of hygiene has been given increasing importance.

There are essentially two types of rigid screens which are available in different heights. There are compact folding screens which fold out in a number of sections to form a discrete screen and which are mounted either on a wall via WA rails or on a trolley for total mobility. Further, there are triple screens where two wings or sections fold out to form a screen or sightscreen. Thus, there is a great need in the art to adapt prior art integrity-protecting screening systems so that they satisfy the above disclosed wishes and needs.

SUMMARY

The task forming the basis of the present invention is to satisfy the above-outlined needs.

This task is solved according to the present invention in the arrangement disclosed by way of introduction in that it has been given the characterising features as described below.

The present invention realises an arrangement with a supporting base plate, optimally positioned weights and a covering hood which make for a reduction of the space requirement at the same overall weight and with the same resistance to tilting. This possibility of reducing the space requirement without jeopardizing safety is many times decisive for whether screening which is desirable and necessary from the point of view of the patient and the care given may be put into effect at all. The arrangement according to the present invention permits optimation of a tilt resistance for both tilting forwards and backwards as well as to the right and the left by the positioning of weights. This is optimised also for screens of different heights. The arrangement according to the present invention makes for the use of the same covering hood for different screens. The supporting base plate in the arrangement according to the present invention forms a rigid structure at the same time as those surfaces with which the care staff and patients may come into contact can be given a gentle and soft design. The arrangement according to the present invention makes possible smooth surfaces on both the upper side and lower side, with joints only positioned on the lower side. This also implies surfaces which may readily be wiped, and thereby improved hygiene. The relatively large inward bight in the base plate and the hood thereon impart to the screen a natural and compact home position on erection and movement of the folding screen. In a triple screen with the arrangement according to the present invention, the powerful inward bight will form a natural space for the feet of a walker on movement of the screen and, in cramped spaces, a care provider may be able to stand in the space created by the bight in order to provide the necessary care.

BRIEF DESCRIPTION OF THE DRAWINGS

Embodiments of the arrangement according to the present invention will be described in greater detail hereinbelow with reference to the accompanying Drawings.

FIG. 6 is a view from above of a part of the embodiment of an arrangement according to the present invention illustrated in FIGS. 1 and 4.

FIG. 7 shows from above another part of the embodiment of the arrangement according to the present invention illustrated in FIGS. 1 and 4.

FIG. 8 shows a section taken along the line A-A in FIG. 7.

FIG. 10 shows from above another part of the embodiment of the arrangement according to the present invention illustrated in FIGS. 2, 3 and 5.

FIG. 11 shows a section taken along the line A-A in FIG. 10.

DETAILED DESCRIPTION OF EMBODIMENTS THE INVENTION

Figure 1:
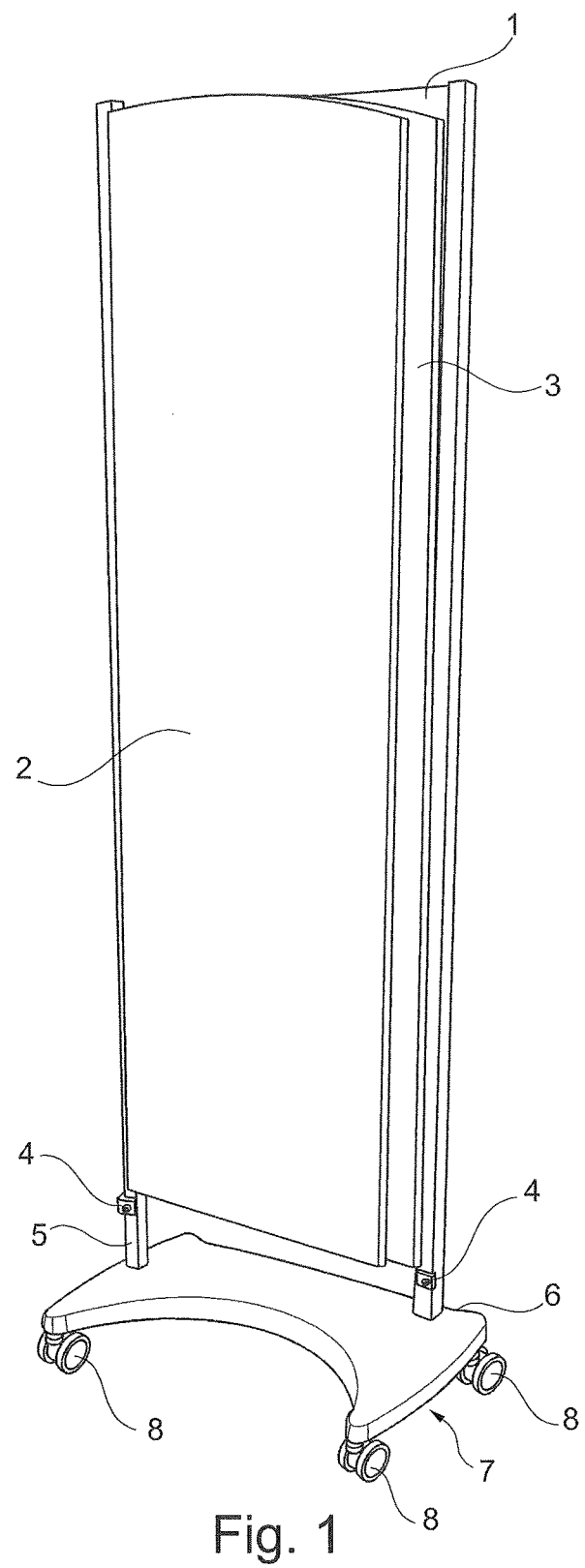
FIG. 1 is a photographic projection showing one embodiment of an arrangement according to the present invention in connection with a triple screen.
Figure 4:
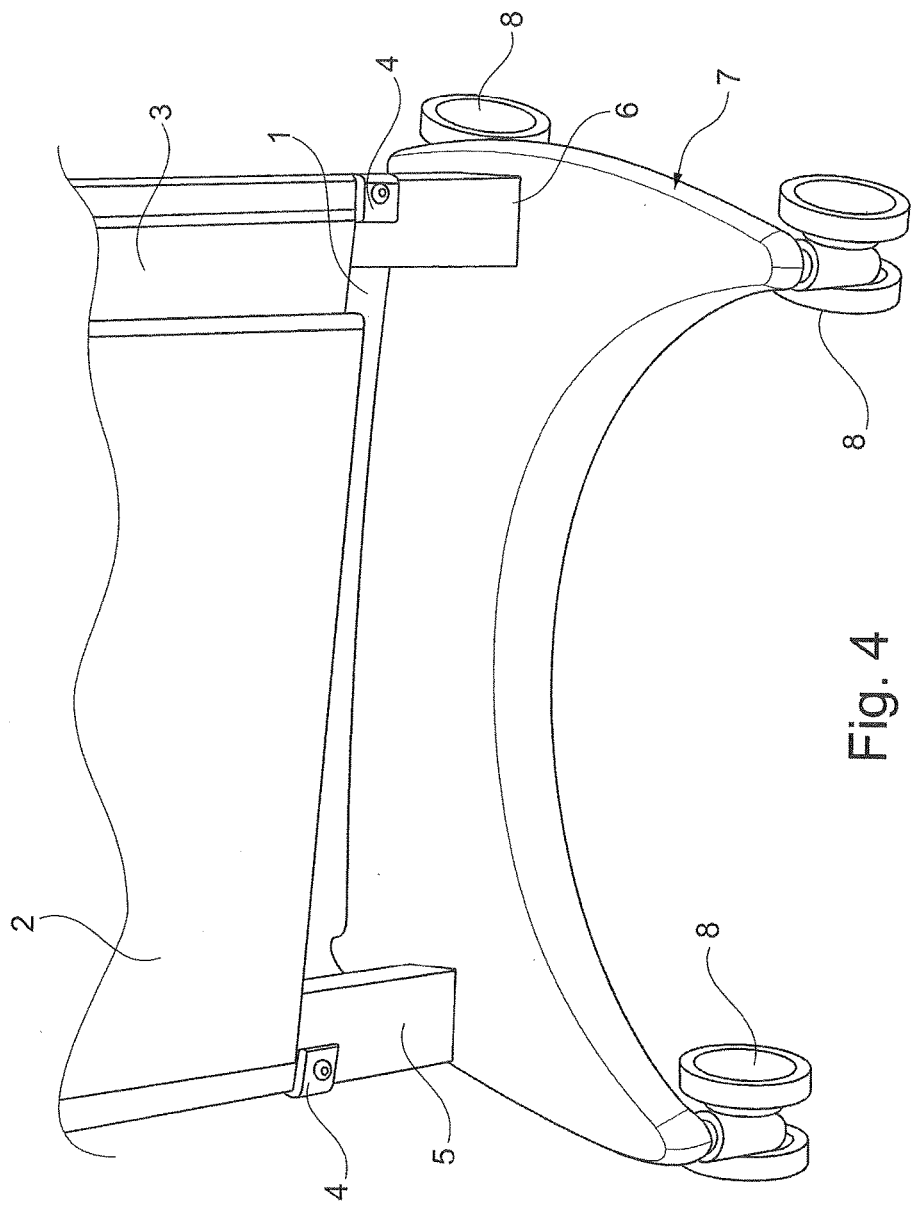
FIG. 4 is a photographic projection showing a lower region of the embodiment of an arrangement according to the present invention as shown in FIG. 1, but on a larger scale.

The arrangement according to the present invention illustrated in FIGS. 1 and 4 supports a screen with three sections 1, 2 and 3. Section 1 is fixed, while section 2 is pivotally or rotatably disposed at the left-hand edge of the fixed section 1 in FIG. 1 and may be provided with a friction joint 4 at the lower corner. The friction joint 4 may be of the type which is the subject matter of Swedish Patent Specification 0401171-4/530065. Section 3 is disposed in the same manner as section 2, but at the right-hand edge of the fixed section 1 in FIGS. 1 and 4 and behind it so that it is not visible in its entirety in FIGS. 1 and 4, but in principle only the friction joint 4 at its lower corner.

The fixed section 1 is mounted on two posts 5 and 6 which extend along the edges of the fixed section 1. The posts 5 and 6 extend from a foot 7 and are anchored therein. In the present embodiment, the foot 7 is provided with a swivel wheel or castor 8 at each corner, at least one of the wheels 8 being provided with a brake mechanism which is easy to engage and disengage by means of a foot pedal. The wheel 8 is of per se known type and, naturally, there is nothing to prevent all of the wheels 8 from being provided with a brake.

The foot 7 is shown in greater detail in FIG. 6 and has a base plate 9 with substantially rectangular configuration, displaying four corners 10, 11, 12 and 13. The short sides 14 and 15 between the corners 10 and 11; and 12 and 13, respectively, as well as the longitudinal sides 16 between the corners 11 and 12 are gently arcuate, while the long side between the corners 10 and 13 displays a powerful inward bight 17. The bight 17 is in the form of an arc of a circle and extends past the centre of the base plate 9. The material in the bight 17 is taken care of for realising four weights 18, 19, 20 and 21. The weights are substantially of equal size and have substantially the same shape. Inside the corner 10, the base plate 9 has a weight contour 22 for two of the weights 18-21, and inside the corner 13, the base plate 9 has a weight contour 23 for two of the weights 18-21. In each corner 10, 11, 12 and 13, the base plate 9 has a hole 24, 25, 26 and 27 for wheel axles. The weights 18, 19, 20 and 21 each have an anchorage hole 28, 29, 30 and 31 for cooperation with corresponding holes 32 and 33 in the weight contours 22 and 23 and suitable anchorage devices, e.g. bolts. At the short side 14, the base plate 9 has a hole 34 for fixing the post 5 with suitable means, e.g. a stub shaft from the post, washers and nuts. At the short side 15, the base plate 9 has a hole 35 for fixing the post 6 with suitable means, e.g. a stub shaft from the post, washers and nuts.

The base plate 9 and the weights 18, 19, 20 and 21 are advantageously manufactured from sheet steel of a thickness of approx. 8 mm, which has proved to be fully sufficient for the contemplated balance in the mobile screen in FIGS. 1 and 4.

FIGS. 7 and 8 illustrate a hood 36 for the base plate 9 and the weights 19-21, while FIG. 8 is a section taken along the line A-A in FIG. 7. The hood 36 fits snugly on the base plate 9 with the weights 18-21. The hood 36 has substantially the same outer and inner contour configuration as the base plate 9 and may, as it were, enclose the base plate. In each corner, the hood 36 has a thread insert 37, 38, 39 and 40 basically straight above the holes 24-27 in the base plate 9 so that the hood 36 is fixable on the base plate 9 by means of suitable bolts or threaded stub shafts on the wheels 8. The hood 36 further displays a hole 41 for the post 5 and a hole 42 for the post 6.

The hood 36 is suitably manufactured from an appropriate plastic material and has a smooth, rounded and gentle design.

Figure 2:
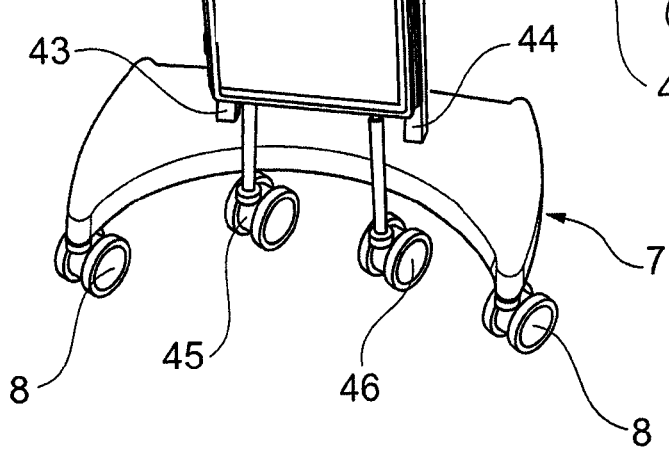
FIG. 2 is a photographic projection showing one embodiment of an arrangement according to the present invention in connection with a folding screen with a larger number of sections.
Figure 5:
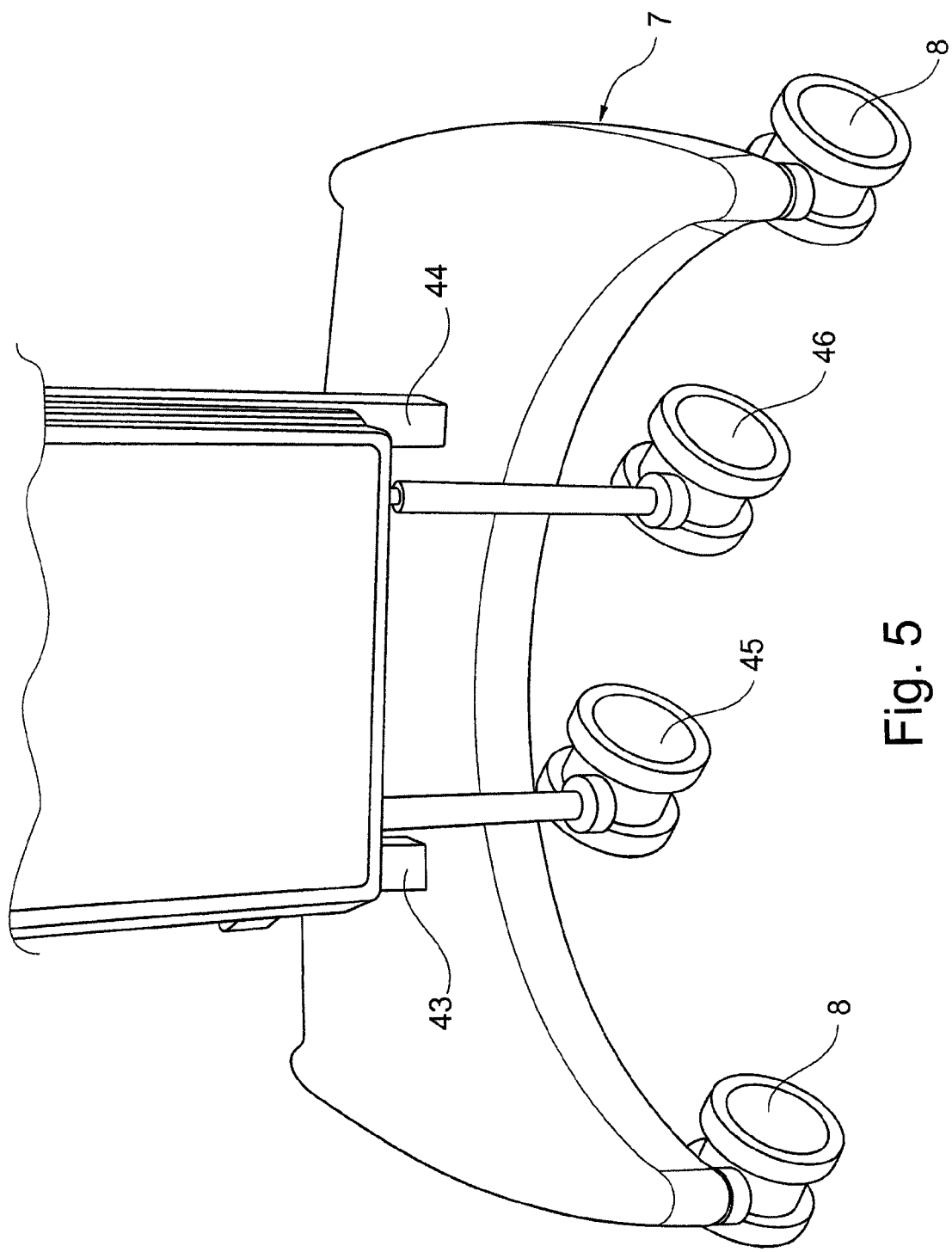
FIG. 5 is a photographic projection of a lower region of the embodiment of an arrangement according to the present invention as shown in FIG. 2, but on a larger scale.

The arrangement according to the present invention illustrated in FIGS. 2 and 5 supports a folding screen of, for example, 3-15 sections of per se known type, which are foldably or pivotally interconnected to one another by means of a joint of the type which is subject matter of Swedish Patent Specification 9803911-8/513282. The first section is mounted on two posts 43 and 44, which are anchored in a foot 7 of substantially the same type as that described above in connection with the embodiment in FIGS. 1, 4 and 6. The sections are provided with support wheels 45 and 46.

The same parts in the different embodiments carry the same reference numerals.

Figure 9:
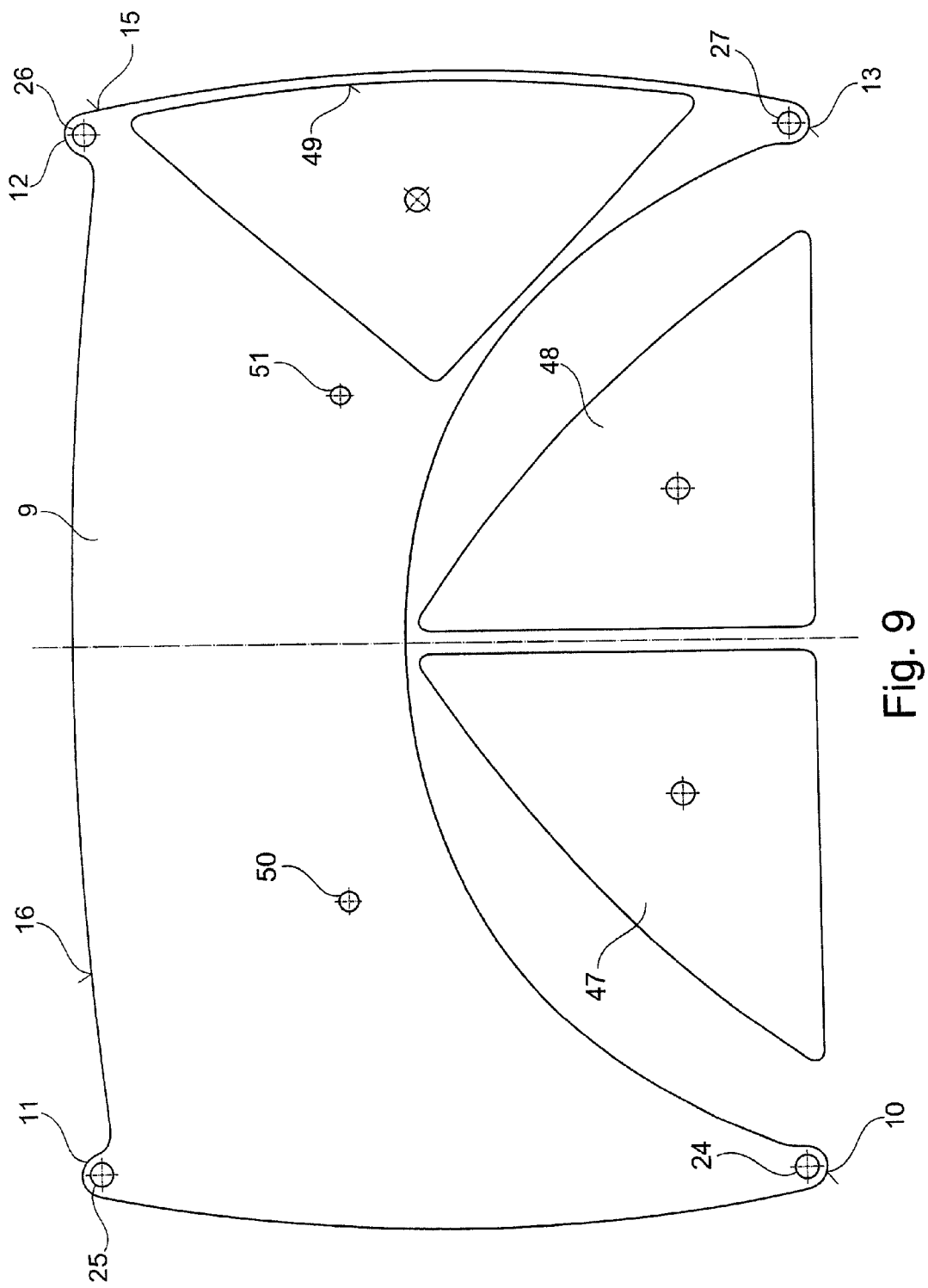
FIG. 9 is a view from above of a part of the embodiment of the arrangement according to the present invention illustrated in FIGS. 2, 3 and 5.

FIG. 9 shows a base plate 9 which is substantially identical to the above-described base plate, although only two weights 47 and 48 are formed from the material in the bight 17. The two weights 47 and 48 are intended for the weight contour 49. The holes therein and in the weight contour 49 of the base plate are aligned with one another and are intended for anchoring of the weights 47 and 48 on the base plate 9. The base plate 9 has two holes 50 and 51 each for one of the posts 43 and 44. The folding screen in FIGS. 2, 3 and 5 starts from the post 43 which is anchored in the hole 50 so that the weights will serve as counterweights.

The hood 36 illustrated in FIGS. 10 and 11 for the base plate 9 illustrated in FIG. 9 is identical to the hood 36 for the base plate 9 in FIG. 7 apart from the fact that the holes 41 and 42 for the posts are moved in to a position straight over the holes 50 and 51.

Figure 3:
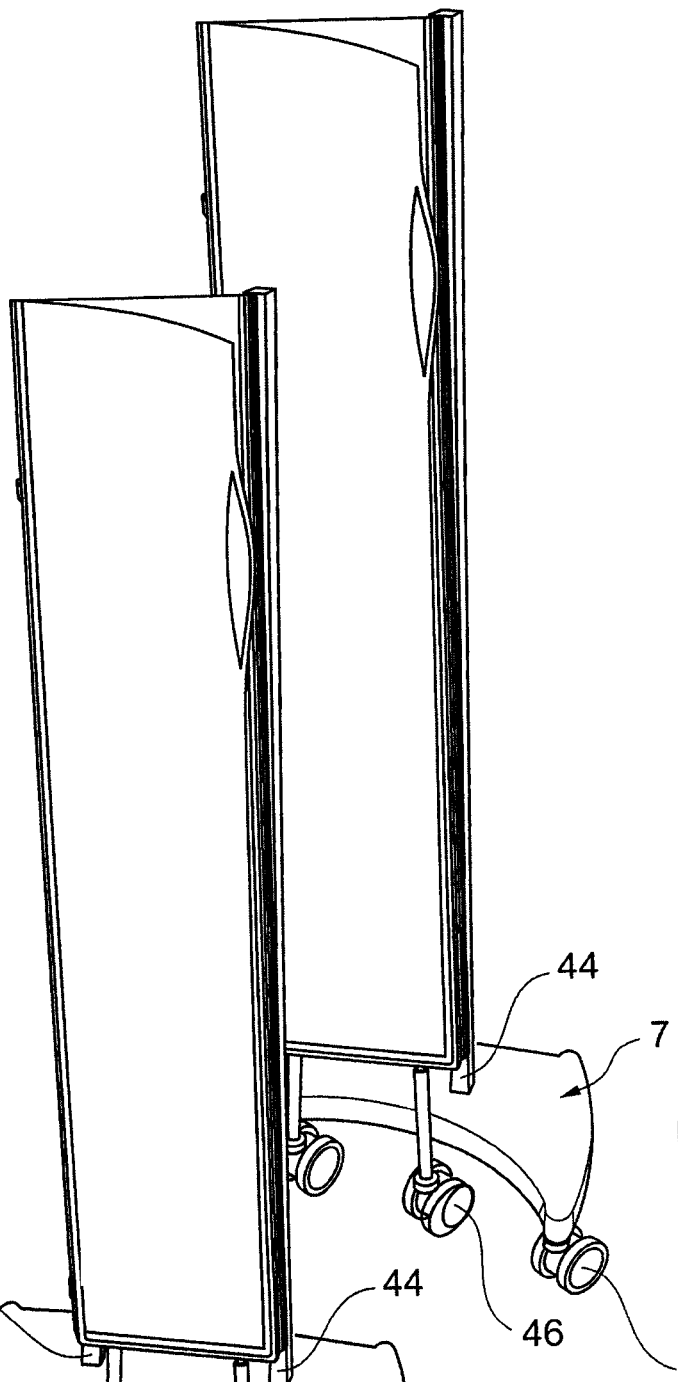
FIG. 3 shows a similar projection to that of FIG. 2 of the same embodiment of the arrangement according to the present invention in connection with a higher folding screen than in FIG. 2.

The embodiment in FIG. 3 is similar to the embodiment in FIGS. 2 and 4 apart from the fact that the folding screen is higher than in FIG. 2. The arrangement according to the present invention is sufficient to cater for this taller folding partition as well.

Many modifications are naturally conceivable without departing from the scope of the inventive concept as defined in the appended Claims.

The invention claimed is:

1. An arrangement for a screen with a plurality of sections which form a screen-off, the arrangement comprising:
   the plurality of sections comprising a fixed section and a pivotal section which is pivotal in relation to the fixed section; and
   a foot comprising:
      a supporting base plate; and
      means for counteracting tilting forces acting on the base plate; and
      a hood which covers the base plate for preventing an object from contacting at least an upper side of the base plate and a portion of edges of the base plate,
      a post, the fixed section being mounted on the post and the post being fixed to the base plate and projecting perpendicularly from the base plate through a hole in the hood,
   wherein an outer perimeter of the base plate includes a plurality of corners, and in a closed state the pivotal section is positionable within a perimeter formed by the plurality of corners in a plan view,
   wherein the base plate comprises a rectangular shape and each section of the plurality of sections comprises a rectangular shape, and a length of a longitudinal side of the plurality of sections is greater than a length of a longitudinal side of the base plate, and
   wherein in the closed state a short side of the pivotal section is positionable over and facing an upper surface of the hood.

2. The arrangement as claimed in claim 1, wherein the base plate has a bight on the longitudinal side of the base plate.

3. The arrangement as claimed in claim 2, wherein the bight extends from a corner of the longitudinal side in towards a centre of the base plate.

4. The arrangement as claimed in claim 3, wherein the bight is arcuate and extends past the centre of the base plate.

5. The arrangement as claimed in claim 2, wherein the means for counteracting tilting force comprises a plurality of counterweights which include base plate material obtained on formation of the bight.

6. The arrangement as claimed in claim 5, wherein the counterweights are fixed in positions to counteract tilting forces.

7. The arrangement as claimed in claim 3, wherein at least one counterweight is fixed at a short side of the base plate.

8. The arrangement as claimed in claim 5, wherein the counterweights comprise a first pair of counterweights fixed at a corner between a short side of the base plate and the bight of the base plate, and a second pair of counterweights fixed at another corner between another short side of the base plate and the bight of the base plate.

9. The arrangement as claimed in claim 5, wherein the counterweights comprise a pair of counterweights that are fixed at a short side of the base plate.

10. The arrangement as claimed in claim 1, further comprising:
a swivel wheel formed at a corner of the base plate and including a brake.

11. The arrangement as claimed in claim 3, wherein the means for counteracting tilting force comprises a plurality of counterweights which include base plate material obtained on the formation of the bight.

12. The arrangement as claimed in claim 5, wherein at least one counterweight is fixed at a short side of the base plate.

13. The arrangement as claimed in claim 6, wherein at least one counterweight is fixed at a short side of the base plate.

14. The arrangement as claimed in claim 2, further comprising:
a swivel wheel formed at a corner of the base plate and including a brake.

15. The arrangement as claimed in claim 3, further comprising:
a swivel wheel formed at a corner of the base plate and including a brake.

16. The arrangement as claimed in claim 4, further comprising:
a swivel wheel formed at a corner of the base plate and including a brake.

17. The arrangement as claimed in claim 5, further comprising:
a swivel wheel formed at a corner of the base plate and including a brake.

18. The arrangement as claimed in claim 6, further comprising:
a swivel wheel formed at a corner of the base plate and including a brake.

19. The arrangement as claimed in claim 7, further comprising:
a swivel wheel formed at a corner of the base plate and including a brake.

20. A screen, comprising:
a plurality of sections, comprising:
a fixed section; and
a pivotal section which is pivotally mounted on the fixed section; and
a foot, the fixed section being mounted on the foot, and the foot comprising:
a supporting base plate;
a weight formed on the base plate and counteracting a tilting force acting on the base plate; and
a hood which covers an upper surface of the base plate and inhibits an object from contacting of the upper surface of the base plate; and
a post, the fixed section being mounted on the post and the post being fixed to the base plate and projecting perpendicularly from the base plate through a hole in the hood,
wherein an outer perimeter of the supporting base plate includes a plurality of corners, and in a closed state the pivotal section is positionable within a perimeter formed by the plurality of corners in a plan view,
wherein the base plate comprises a rectangular shape and each section of the plurality of sections comprises a rectangular shape, and a length of a longitudinal side of the plurality of sections is greater than a length of a longitudinal side of the base plate, and
wherein in the closed state a short side of the pivotal section is positionable over and facing an upper surface of the hood.

21. The arrangement as claimed in claim 1, wherein the hood comprises a plastic material and has a rounded upper surface, and covers the base plate and the means for counteracting tilting forces.

22. The arrangement as claimed in claim 1, wherein an inner and outer contour configuration of the hood is substantially the same as an inner and outer contour configuration of the base plate, such that the hood fits securely on the base plate.

23. The arrangement as claimed in claim 1, further comprising:
a post which is fixed to the base plate, the fixed section being mounted on the post, wherein the hood comprises a hole and the post protrudes from the base plate through the hole in the hood.

24. The arrangement as claimed in claim 1, further comprising:
a plurality of wheels which are fixed to a bottom surface of the base plate, the base plate including a plurality of holes and an axle of the plurality of wheels being threadably fixed in the plurality of holes, respectively, wherein the hood is fixed to the upper surface of the base plate.

25. The arrangement as claimed in claim 1, further comprising:
support wheels which are connected to the pivotal section, such that if the pivotal section is in the closed state, the support wheels are located in a bight formed in the longitudinal side of the base plate.

26. The arrangement as claimed in claim 1, wherein the longitudinal side of the fixed section projects perpendicularly from the base plate.

27. The arrangement as claimed in claim 26, wherein in the closed state, the fixed section is not visible through the pivotal section.

28. A screen, comprising:
a foot, comprising:
a base plate;
a weight formed on the base plate and counteracting a tilting force acting on the base plate; and
a hood which is fixed to the base plate, covers the weight and an upper surface of the base plate, and inhibits an object from contacting the upper surface of the base plate;
a post which is perpendicularly fixed to the base plate, the hood comprising a hole and the post projecting from the base plate through the hole in the hood;
a plurality of sections, comprising:
a fixed rectangular section which is fixed to the post, a lengthwise direction of the fixed rectangular section being formed along a lengthwise direction of the post; and
a pivotal rectangular section which is pivotally mounted on the fixed section so as to be pivotal on a vertical axis, a lengthwise direction of the pivotal rectangular, pivotal rectangular section being formed along a lengthwise direction of the fixed rectangular section; and
a plurality of wheels which are fixed to a bottom surface of the base plate, the base plate including a plurality of holes and an axle of the plurality of wheels being fixed in the plurality of holes, respectively,
wherein an outer perimeter of the base plate includes a plurality of corners, and in a closed state the pivotal section is positionable within a perimeter formed by the plurality of corners in a plan view, wherein the base plate is substantially rectangular and includes a bight on a longitudinal side of the base plate, the bight being arcuate, and extending from a corner of the longitudinal side in towards a center of the base plate and past the center of the base plate, wherein a length of a longitudinal side of each section of the plurality of sections is greater than a length of the longitudinal side of the base plate, wherein in the closed state, the fixed section is not visible through the pivotal section, and wherein in the closed state a short side of the pivotal section is positionable over and facing an upper surface of the hood.

29. The arrangement as claimed in claim 1, wherein the pivotal section comprises a pivotal and foldable section.

30. The arrangement as claimed in claim 1, wherein the base plate comprises a steel plate and the post is fixed to a hole in the steel plate.

31. The arrangement as claimed in claim 1, wherein the longitudinal side of the fixed section projects perpendicularly from the base plate and is substantially parallel with the longitudinal side of the pivotal section, and the longitudinal side of the fixed section pivots in relation to the longitudinal side of the pivotal section.

* * * * *